US011949767B2

(12) United States Patent
Abe

(10) Patent No.: US 11,949,767 B2
(45) Date of Patent: Apr. 2, 2024

(54) COMMUNICATION APPARATUS, METHOD OF CONTROLLING COMMUNICATION APPARATUS, AND STORAGE MEDIUM

(71) Applicant: CANON KABUSHIKI KAISHA, Tokyo (JP)

(72) Inventor: Mitsumasa Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/305,964

(22) Filed: Apr. 24, 2023

(65) Prior Publication Data

US 2023/0261850 A1 Aug. 17, 2023

Related U.S. Application Data

(63) Continuation of application No. 17/548,014, filed on Dec. 10, 2021, now Pat. No. 11,664,969.

(30) Foreign Application Priority Data

Dec. 17, 2020 (JP) ................................ 2020-209640

(51) Int. Cl.

| | |
|---|---|
| ***H03D 3/24*** | (2006.01) |
| ***H04J 3/06*** | (2006.01) |
| ***H04L 7/00*** | (2006.01) |

(52) U.S. Cl.

CPC .......... *H04L 7/0037* (2013.01); *H04J 3/0667* (2013.01); *H04L 7/0012* (2013.01)

(58) Field of Classification Search

CPC .... H04L 7/0037; H04L 7/0012; H04J 3/0667; H03L 7/26; H03L 7/08; G06F 1/12

USPC ......................... 375/373, 356, 354, 362, 371

See application file for complete search history.

(56) References Cited

U.S. PATENT DOCUMENTS

| | | | | |
|---|---|---|---|---|
| 8,081,663 | B2 * | 12/2011 | Tamura ................ | H04J 3/0667 370/503 |
| 11,664,969 | B2 * | 5/2023 | Abe ...................... | H04L 7/0012 375/354 |
| 2008/0170588 | A1 * | 7/2008 | Tapie ........................ | H03L 7/08 370/464 |
| 2010/0220748 | A1 * | 9/2010 | Inomata .................... | G06F 1/12 370/503 |
| 2016/0072513 | A1 * | 3/2016 | Dickerson ................. | H03L 7/26 331/16 |

* cited by examiner

*Primary Examiner* — Phuong Phu

(74) *Attorney, Agent, or Firm* — Canon U.S.A., Inc. IP Division

(57) ABSTRACT

A communication apparatus includes a first counter configured to synchronize with a reference time, a second counter configured to synchronize with the first counter, a generation unit configured to generate a synchronization signal each time when a value of the second counter is incremented by a predetermined number, a correction unit configured to correct the value of the second counter toward a value of the first counter, and a control unit configured to control the correction unit to cause the correction unit to calculate a difference between the value of the first counter and the value of the second counter and, in a case where the calculated difference is greater than a predetermined threshold value, the correction unit to correct the value of the second counter step by step.

13 Claims, 9 Drawing Sheets

COMMUNICATION APPARATUS, METHOD OF CONTROLLING COMMUNICATION APPARATUS, AND STORAGE MEDIUM

CROSS-REFERENCE TO RELATED APPLICATIONS

This application is a continuation of U.S. patent application Ser. No. 17/548,014, filed on Dec. 10, 2021, and claims the benefit of Japanese Patent Application No. 2020-209640, filed Dec. 17, 2020, each of which are hereby incorporated by reference herein in their entireties.

BACKGROUND OF THE DISCLOSURE

Field of the Disclosure

The present disclosure relates to a communication apparatus configured to execute clock synchronization using a network.

Description of the Related Art

In recent years, techniques for clock-synchronizing a plurality of devices to utilize the devices as a large system are used in many fields.

Examples of such systems include stadium vision and volumetric studio techniques by which free-viewpoint video images are generated in real time using images from a plurality of cameras that is clock synchronized, in response to changing a viewpoint to a desired viewpoint.

In order to acquire high-quality free-viewpoint video images, a plurality of cameras needs to be clock synchronized accurately. An example of a technique for clock synchronization between communication terminals that control cameras is the Precision Time Protocol (PTP). In clock synchronization between the communication terminals and the cameras, a synchronization signal, such as a pulse per second (PPS) or generator lock (GenLock) signal, can be used.

Since Internal clocks of the communication terminals that control the cameras can contain an error originating from jitter, for example, a system that executes clock synchronization generally includes a time server that provides a reference time. The time server includes a highly-accurate clock, such as the Global Positioning System (GPS), as a reference for matching synchronization signals and provides the time of the time server as a reference time to the communication terminals.

Japanese Patent Application Laid-Open No. 2018-191226 discusses a synchronization signal output apparatus that acquires the time from a time server, synchronizes an internal clock with the time, generates a synchronization signal, and outputs the synchronization signal to an image capturing apparatus. Specifically, the synchronization signal output apparatus discussed in Japanese Patent Application Laid-Open No. 2018-191226 acquires an error between the time of the time server and the time of the internal clock, and in a case where the acquired error is greater than a threshold value, the synchronization signal output apparatus selects a setting of an operation mode in which synchronization signal timing adjustment based on the error is not performed. Specifically, in a case where the error between the time of the time server and the time of the internal clock is greater than the threshold value, a self-operating mode in which synchronization signal adjustment is not performed is used to prevent a situation where a synchronization signal shifted by a predetermined amount or greater is input to the image capturing apparatus and image capturing can no longer be continued.

SUMMARY OF THE DISCLOSURE

According to an aspect of the present disclosure, a communication apparatus includes a first counter configured to synchronize with a reference time, a second counter configured to synchronize with the first counter, a generation unit configured to generate a synchronization signal each time when a value of the second counter is incremented by a predetermined number, a correction unit configured to correct the value of the second counter toward a value of the first counter, and a control unit configured to control the correction unit to cause the correction unit to calculate a difference between the value of the first counter and the value of the second counter and, in a case where the calculated difference is greater than a predetermined threshold value, the correction unit to correct the value of the second counter step by step.

Further features of the present disclosure will become apparent from the following description of exemplary embodiments with reference to the attached drawings.

DESCRIPTION OF THE EMBODIMENTS

Not all communication terminals that control cameras include a highly-accurate internal clock.

According to the technique discussed in Japanese Patent Application Laid-Open No. 2018-191226, in a case where an internal clock of a communication terminal has low accuracy, a synchronization signal that is input from the communication terminal to cameras may be shifted gradually. In this case, if the communication terminal continues to output gradually shifted synchronization signals to the cameras without executing re-synchronization processing with a reference time provided from a time server, it may become difficult to continue synchronized image capturing using the plurality of cameras.

The present disclosure is directed to a technique for preventing a decrease in accuracy of clock synchronization regardless of the magnitude of a difference between a reference time and a time of an apparatus.

Various exemplary embodiments of the present disclosure will be described in detail below with reference to the attached drawings. It should be noted that each exemplary embodiment described below is a mere example and should be modified or changed as needed depending on a configuration of an apparatus to which the present disclosure is applied or various conditions, and the present disclosure is not limited to the exemplary embodiments described below. Not all combinations of features described in the exemplary embodiments are essential to the technical solution of the present disclosure.

<Network Configuration of Clock Synchronization System>

Figure 1:
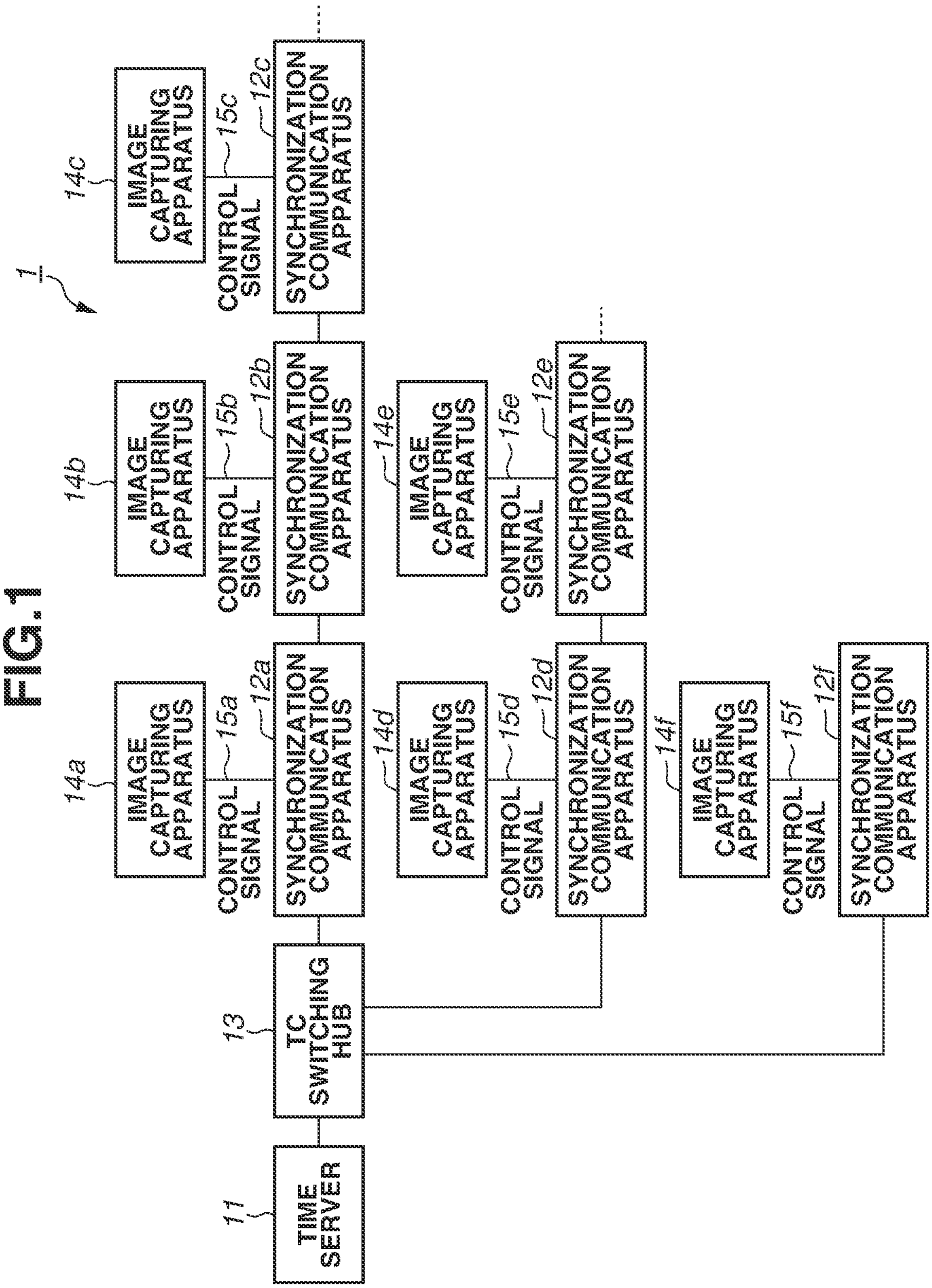
FIG. 1 is a diagram illustrating an example of a network configuration of a clock synchronization system according to an exemplary embodiment of the present disclosure.

FIG. 1 is a diagram illustrating an example of a network configuration of a system that executes clock synchronization according to an exemplary embodiment of the present disclosure. While FIG. 1 illustrates a system for synchronized image capturing using a plurality of image capturing apparatuses as an example, the present exemplary embodiment is not limited to the example and is applicable to any system that can use clock synchronization using a network.

A clock synchronization system 1 in FIG. 1 includes a time server 11, a plurality of synchronization communication apparatuses 12*a*, 12*b*, 12*c*, 12*d*, 12*e*, and 12*f*, a transparent clock (TC) switching hub 13, and a plurality of image capturing apparatuses 14*a*, 14*b*, 14*c*, 14*d*, 14*e*, and 14*f*.

In FIG. 1, the time server 11 is connected to the synchronization communication apparatuses 12*a*, 12*d*, and 12*f* via a network using the TC switching hub 13 and transmits time information about the time server 11 to the synchronization communication apparatuses 12*a*, 12*d*, and 12*f*. Alternatively, the time server 11 can be connected directly to the synchronization communication apparatuses 12*a*, 12*d*, and 12*f* without the TC switching hub 13. The synchronization communication apparatuses 12*b* and 12*c* are connected to the synchronization communication apparatus 12*a* in a daisy chain, and the synchronization communication apparatus 12*a* is connected to the synchronization communication apparatus 12*d* in a daisy chain.

Each of the image capturing apparatuses 14*a* to 14*f*, such as cameras, is connected to a corresponding one of the synchronization communication apparatuses 12*a* to 12*f* via the network. The synchronization communication apparatuses 12*a* to 12*f* are clock synchronized with one another via the network and transmit and receive data.

The network can be, for example, Gigabit Ethernet® (GbE), 10 GbE, or 100 GbE, which are Ethernet® defined by the Institute of Electrical and Electronics Engineers (IEEE) standards. The network can be used in combination with another wired line, such as an interconnect (InfiniBand) or an industrial Ethernet®. The network is not limited to those described above and can be a network of another type, such as a wireless network using Wi-Fi® or Bluetooth® or a combination thereof.

The time server 11 is a server that includes an accurate internal clock and provides the time of the clock of the time server 11 as a time source using a clock synchronization protocol. Examples of the time source of the time server 11 according to the present exemplary embodiment include, but not limited to, the Global Positioning System (GPS), a standard radio wave, and an atomic clock. A time source of another type with greater accuracy than the synchronization communication apparatuses 12*a* to 12*f* can be used as the time source of the time server 11, such as an oven controlled X-tal oscillator (OCXO).

The clock synchronization protocol can be the Precision Time Protocol (PTP) defined by the IEEE 1588 standard, but the present exemplary embodiment is not limited to this clock synchronization protocol. The system according to the present exemplary embodiment can employ a clock synchronization protocol of another type such as Audio Video Bridging (AVB) defined by the IEEE 802.1 standard or pulse per second (PPS) signals. The clock synchronization system 1 in FIG. 1 can include a plurality of time servers 11 to have redundancy in clock synchronization.

The synchronization communication apparatuses 12*a* to 12*f* can all be the same apparatuses or can include a different configuration at least including the below-described functions. The synchronization communication apparatuses 12*a* to 12*f* include an internal clock, update the time of each clock using the clock synchronization protocol, and transmit control signals 15*a* to 15*f* to the image capturing apparatuses 14*a* to 14*f*, respectively.

When the synchronization communication apparatuses 12*a* to 12*f* cannot receive the clock synchronization protocol, the synchronization communication apparatuses 12*a* to 12*f* maintain synchronization signals in the control signals 15*a* to 15*f* each using a corresponding one of the clocks of the synchronization communication apparatuses 12*a* to 12*f* and execute clock synchronization with the image capturing apparatuses 14*a* to 14*f*, respectively.

The synchronization communication apparatus 12*b*, for example, is connected in between the synchronization communication apparatuses 12*a* and 12*c*, and transmits and receives time information and image data. The synchronization communication apparatus 12*b* transmits a synchronization signal generated based on time information from the synchronization communication apparatuses 12*a* and 12*c*, which are provided at the preceding and following stages of the synchronization communication apparatus 12*b* to the image capturing apparatus 14*b* connected to the synchronization communication apparatus 12*b*.

The synchronization communication apparatuses 12*a* to 12*f* can be connected in any form. The synchronization communication apparatuses 12*a* to 12*f* can be connected in a daisy chain similarly to the synchronization communication apparatuses 12*a*, 12*b*, and 12*c* and the synchronization communication apparatuses 12*d* and 12*e*. Alternatively, the synchronization communication apparatuses 12*a* to 12*f* can be connected in a star connection form using the TC switching hub 13 similarly to the synchronization communication apparatuses 12*a*, 12*d*, and 12*f*. The connection between the synchronization communication apparatuses 12*a* to 12*f* can be doubled to have redundancy in clock synchronization.

The TC switching hub 13 has a TC function of measuring the time needed to execute PTP packet relay processing by the TC switching hub 13 and notifying the measured time to a delivery destination of a PTP message. The TC switching hub 13 is a hub that connects the time server 11 and a connection destination provided at a following stage of the TC switching hub 13 to each other while maintaining the clock synchronization protocol. The TC switching hub 13 is used in a case where the plurality of time servers 11 is used or the synchronization communication apparatuses 12a, 12d, and 12f are connected in a star connection form, whereas the TC switching hub 13 does not have to be used in a case where the time server 11 includes a plurality of ports and the synchronization communication apparatuses 12a, 12d, and 12f are connected directly to each other.

The image capturing apparatuses 14a to 14f are counterpart apparatuses that are output destinations of the control signals 15a to 15f from the synchronization communication apparatuses 12a to 12f. Each of the image capturing apparatuses 14a to 14f receives a corresponding one of the control signals 15a to 15f from the synchronization communication apparatuses 12a to 12f and transmits image data obtained by synchronized image capturing based on a synchronization signal in the corresponding one of the control signals 15a to 15f to the synchronization communication apparatuses 12a to 12f, respectively. Each of the image capturing apparatuses 14a to 14f includes an internal clock and update the time of the clock based on the corresponding one of the control signals 15a to 15f.

The image capturing apparatuses 14a to 14f have a synchronization signal reception timing during which the synchronization signals in the control signals 15a to 15f are receivable. The image capturing apparatuses 14a to 14f are clock synchronized with the synchronization communication apparatuses 12a to 12f, respectively, by receiving the synchronization signals during a period defined by the synchronization signal reception timing.

The image capturing apparatuses 14a to 14f do not have to have the same configuration and can be, for example, apparatuses of different models. As an apparatus, a range sensor, such as a light detection and ranging (LiDAR) sensor or a radio detecting and ranging (RADAR) sensor, can be included.

Unless otherwise specified, the term "image" according to the present exemplary embodiment refers to a moving image and a still image. Specifically, the clock synchronization system 1 according to the present exemplary embodiment executes clock synchronization processing on a still image and a moving image.

The control signals 15a to 15f are each transmitted from the corresponding one of the synchronization communication apparatuses 12a to 12f to the image capturing apparatuses 14a to 14f, respectively, and each contain setting information and a synchronization signal for the corresponding one of the image capturing apparatuses 14a to 14f. The synchronization signal contains a pulse that notifies the image capturing apparatuses 14a to 14f of correct image capturing intervals, such as a generator locking (GenLock) signal or a timecode signal. Using the synchronization signal as a reference, the image capturing apparatuses 14a to 14f capture a subject image at a synchronized timing to realize image capturing at the synchronized image capturing time at predetermined intervals.

<Internal Configuration of Synchronization Communication Apparatus>

Figure 2:
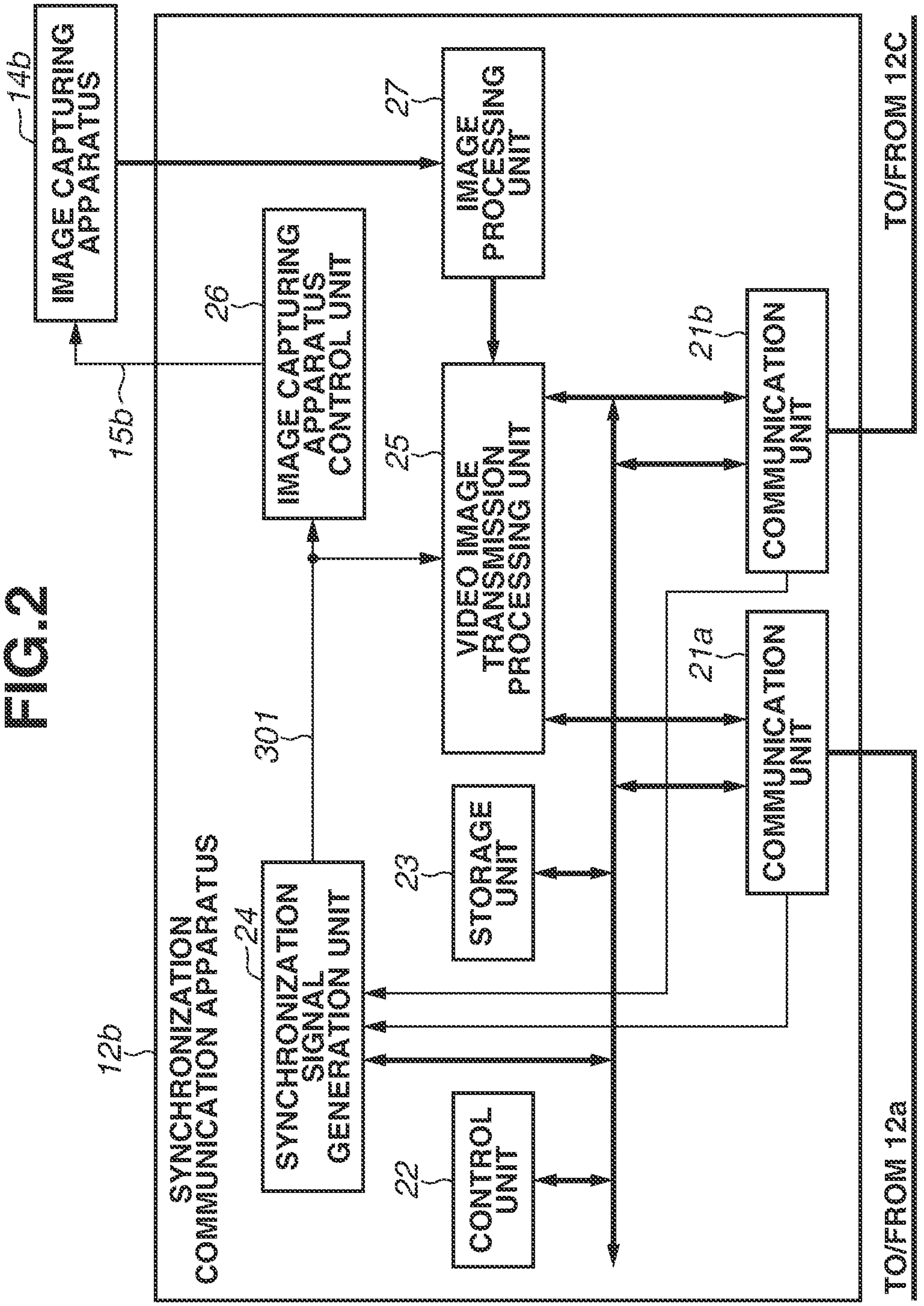
FIG. 2 is a block diagram illustrating an example of an internal configuration of a synchronization communication apparatus according to an exemplary embodiment of the present disclosure.

FIG. 2 is a block diagram illustrating an example of an internal configuration of the synchronization communication apparatuses 12a to 12f illustrated in FIG. 1. The synchronization communication apparatus 12b among the synchronization communication apparatuses 12a to 12f illustrated in FIG. 1 is illustrated in FIG. 2 as an example showing an internal configuration of a synchronization communication apparatus and connections to other apparatuses. The synchronization communication apparatuses 12a and 12c connected to the synchronization communication apparatus 12b and the synchronization communication apparatuses 12d to 12f can have a similar internal configuration.

The synchronization communication apparatus 12b includes communication units 21a and 21b, a control unit 22, a storage unit 23, a synchronization signal generation unit 24, a video image transmission processing unit 25, an image capturing apparatus control unit 26, and an image processing unit 27. The functional blocks (21a, 21b, and 22 to 27) of the synchronization communication apparatus 12b are connected to one another via a system bus and transmit and receive various types of control information and image data. The synchronization communication apparatus 12b is connected to the synchronization communication apparatus 12a and the synchronization communication apparatus 12c, which are provided at the preceding and following stages of the synchronization communication apparatus 12b via the communication unit 21a and the communication unit 21b, respectively.

The communication units 21a and 21b are communication interfaces including a physical layer (PHY), which is the physical layer, and a media access control (MAC) layer, which is the data link layer. The communication unit 21a receives image data from the synchronization communication apparatus 12a provided at the preceding stage of the synchronization communication apparatus 12b and supplies the image data to the video image transmission processing unit 25. The communication unit 21b receives image data from the preceding stage and the image capturing apparatus 14b from the video image transmission processing unit 25 and transmits the image data to the synchronization communication apparatus 12c provided at the following stage of the synchronization communication apparatus 12b.

The communication units 21a and 21b also acquire correct time information and correct timing information from the time server 11 via the clock synchronization protocol, such as PTP, and notify the synchronization signal generation unit 24 of the acquired time information and the acquired timing information.

The term "time information" herein refers to a value that is associated with the current time and can be used by the synchronization signal generation unit 24, and the term "timing information" herein refers to a signal for notification of a timing to update with the value of the time information. If the synchronization communication apparatus 12b is the farthest terminal from the time server 11 in a daisy chain connection or is connected to the time server 11 in a star connection, since the synchronization communication apparatus 12b is a terminating terminal, the communication unit 21b does not have to be connected externally.

The control unit 22 is a processor such as a central processing unit (CPU) that controls the entire synchronization communication apparatus 12b. The control unit 22 controls a clock synchronization sequence defined by a clock synchronization standard, such as PTP and controls transfer of an image packet containing image data received from the synchronization communication apparatus 12a provided at the preceding stage of the synchronization communication apparatus 12b.

The control unit 22 also generates a timecode signal to be stored in the control signal 15b, based on the time information acquired from the communication units 21a and 21b via the system bus. The timecode signal is a timing signal for video image synchronization. The control unit 22 transmits control information 305 for execution of synchronization signal generation processing (correction processing) according to the present exemplary embodiment to the synchronization signal generation unit 24. Details thereof will be described below with reference to FIG. 3.

The storage unit 23 is a main storage device that is shared and used by the functional blocks in the synchronization communication apparatus 12*b* and can include mainly a semiconductor memory, such as a dynamic random access memory (DRAM). The storage unit 23 stores various types of information to be used by the functional blocks (21*a* and 21*b* to 27) of the synchronization communication apparatus 12*b* and stores control information and the like for controlling the image capturing apparatus 14*b*.

The synchronization signal generation unit 24 which has received the time information and the timing information from the communication units 21*a* and 21*b* generates a pulse 301 to be output to the video image transmission processing unit 25 and the image capturing apparatus control unit 26. The pulse 301 is a signal to be a basis for a synchronization signal described below and can be, for example, a PPS having an accurate interval and an accurate rate. Details of a process of generating the pulse 301 will be described below with reference to FIGS. 3 to 5.

The synchronization signal generation unit 24 further includes a register for setting a threshold value to be used in matching the phase of the pulse 301 via the system bus and storing the set threshold value.

The video image transmission processing unit 25 generates an image packet to be output from the synchronization communication apparatus 12*b*. Specifically, the video image transmission processing unit 25 packetizes an image which is captured by the image capturing apparatus 14*b* and received from the image processing unit 27, and transmits the packet together with an image packet received from the synchronization communication apparatus 12*a* preceding the synchronization communication apparatus 12*b* via the communication unit 21*a* to the communication unit 21*b*.

The video image transmission processing unit 25 also receives the pulse 301 from the synchronization signal generation unit 24 and supplies a time stamp to the image data received from the image processing unit 27. If the synchronization communication apparatus 12*b* is the closest terminal to the time server 11 in a daisy chain connection or is connected to the time server 11 in a star connection, there can be no image packets of a preceding synchronization communication apparatus.

The image capturing apparatus control unit 26 generates the control signal 15*b* for controlling the image capturing apparatus 14*b* and transmits the generated control signal 15*b* to the image capturing apparatus 14*b*. Specifically, the image capturing apparatus control unit 26 receives the pulse 301 supplied from the synchronization signal generation unit 24 and generates the synchronization signal in the control signal 15*b*. The image capturing apparatus control unit 26 also stores the timecode signal supplied from the control unit 22 in the control signal 15*b*.

The image processing unit 27 executes various types of image processing on image data transmitted from the image capturing apparatus 14*b*. The image data is captured by the image capturing apparatus 14*b* in synchronization with the synchronization signal in the control signal 15*b* output from the image capturing apparatus control unit 26 to the image capturing apparatus 14*b*. The captured image data is transmitted together with the timecode signal to the image processing unit 27.

The image processing unit 27 executes various types of image processing, such as background/foreground cutting, on the image data received from the image capturing apparatus 14*b* and supplies the processed image data to the video image transmission processing unit 25.

The synchronization signal generation unit 24, the video image transmission processing unit 25, the image capturing apparatus control unit 26, and the image processing unit 27 of the synchronization communication apparatus 12*b* in FIG. 2 can partially or entirely be implemented to hardware. As to a function that is realized by hardware, for example, a dedicated circuit is automatically generated on a field-programmable gate array (FPGA), based on a program for realizing the functions of the functional modules using a predetermined compiler. A gate array circuit can be formed similarly to the FPGA to realize a function by hardware. A function can also be realized by an application-specific integrated circuit (ASIC). As to a function that is realized by software, a program for providing the functions of the functional modules is stored in a memory, such as a read-only memory (ROM). Then, the program is read to a random access memory (RAM), and a CPU executes the read program to realize the function.

The functional block configuration illustrated in FIG. 2 is an example, and a plurality of functional blocks can execute one function, or any of the functional blocks can be divided into blocks to execute a plurality of functions.

Figure 3:
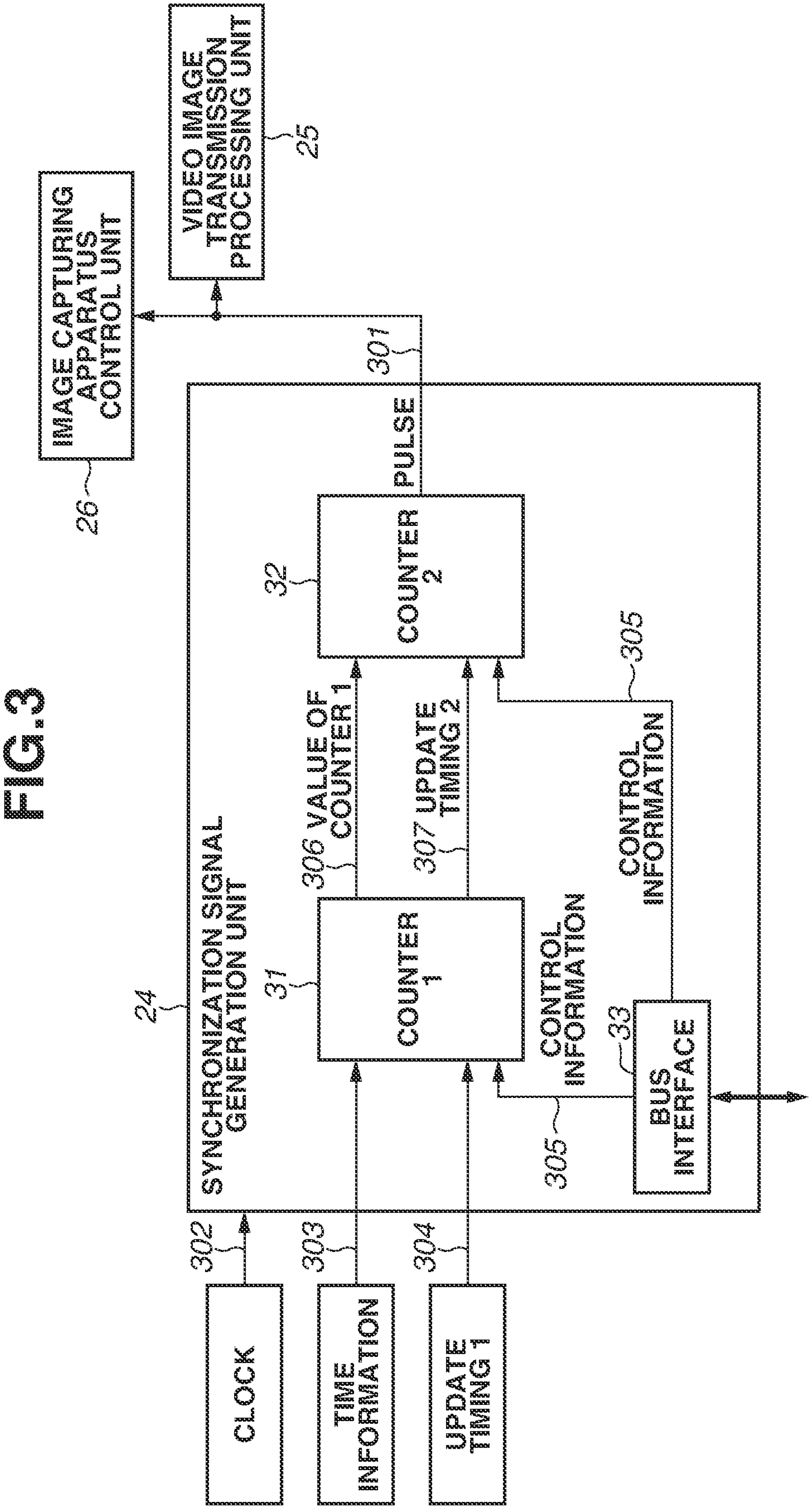
FIG. 3 is a block diagram illustrating an example of a detailed internal configuration of a synchronization signal generation unit illustrated in FIG. 2.

FIG. 3 is a block diagram illustrating an example of a detailed configuration of the synchronization signal generation unit 24 in FIG. 2.

In FIG. 3, the synchronization signal generation unit 24 includes a counter 1 (31), a counter 2 (32), and a bus interface 33. The counters 1 (31) and 2 (32) update respective values of the counters 1 (31) and 2 (32) at a timing of an externally-supplied clock. The bus interface 33 acquires various types of setting information and control information via the system bus.

A clock 302 for driving the components, time information 303 from the communication units 21*a* and 21*b*, and an update timing 1 (304), which is a timing to update the counter 1 (31), are input to the synchronization signal generation unit 24. The synchronization signal generation unit 24 transmits the pulse 301 to the video image transmission processing unit 25 and the image capturing apparatus control unit 26.

The counter 1 (31) is a self-operating counter that allows a value of the self-operating counter to be externally rewritten, and the counter 1 (31) increments a value of the counter 1 (31) based on the clock 302 serving as an internal clock, at a timing other than the update timing 1 (304).

The counter 1 (31) is notified of the time information 303 from the communication units 21*a* and 21*b* and the update timing 1 (304) and is rewritten to the value of the time information 303 at the timing of the update timing 1 (304). Consequently, the counter 1 (31) is synchronized with the correct time from the time server 11 that is a time source. The counter 1 (31) outputs a value 306 of the counter 1 (31) and an update timing 2 (307) generated based on the value 306 to the counter 2 (32).

The counter 2 (32) is a self-operating counter that allows a value of the self-operating counter to be externally rewritten, and the counter 2 (32) increments the value of the counter 2 (32) based on the clock 302 serving as an internal clock, at a timing other than the update timing 2 (307).

The counter 2 (32) is notified of the value 306 of the counter 1 (31) and the update timing 2 (307) by the counter 1 (31) and is updated at the timing of the update timing 2 (307).

According to the present exemplary embodiment, the counter 2 (32) is updated using the value 306 of the counter 1 (31) or a correction value in the control information 305. The counter 2 (32) outputs the pulse 301 by raising a signal level at a timing of when the value of the counter 2 (32) reaches a setting value and by lowering the signal level at the timing of when the value of the counter 2 (32) reaches the setting value next. The setting value is a value at the time of the output of the pulse 301 by the counter 2 (32). Thus, the counter 2 (32) outputs the pulse 301 serving as the synchronization signal to the video image transmission processing unit 25 and the image capturing apparatus control unit 26 each time of when the counter 2 (32) is incremented by a predetermined number.

The bus interface 33 is an interface for external communication by the synchronization signal generation unit 24 via the system bus. The bus interface 33 outputs threshold values to be used in initializing and stopping the counters 1 (31) and 2 (32) and updating the counter 2 (32) as the control information 305 to the counters 1 (31) and 2 (32).

The clock 302 is a clock signal of the internal clocks for driving the counters 1 (31) and 2 (32). The counters 1 (31) and 2 (32) increment the values of the counters 1 (31) and 2 (32), respectively, using the clock 302, at a timing other than the update timings. The clock 302 is also used in driving the bus interface 33.

The time information 303 and the update timing 1 (304) are the correct time information and the correct timing information from the time server 11 that are notified from the communication units 21*a* and 21*b*.

The pulse 301 is a phase pulse generated based on the value of the counter 2 (32). The counter 1 (31) serving as a synchronization source of the counter 2 (32) is synchronized using the time information 303 and the update timing 1 (304). Thus, the synchronization communication apparatuses 12*a* to 12*f* that are clock synchronized transmit the pulse 301 at the same time.

The control information 305 is information containing a correction value and a threshold value for the counters 1 (31) and 2 (32) that are acquired from the control unit 22 via the system bus. According to the present exemplary embodiment, a synchronization signal is generated (corrected) using the correction value and the threshold value for the counters 1 (31) and 2 (32) that are contained in the control information 305 supplied from the control unit 22 via the bus interface 33.

The threshold value herein is a maximum allowable error of the time below which the synchronization communication apparatus 12*b* and the image capturing apparatus 14*b* do not go out of clock synchronization, i.e., synchronized image capturing by the plurality of image capturing apparatuses 14*a* to 14*f* is assured, and can be a fixed value. Specifically, the threshold value is a maximum phase error for the synchronization signal for continuing synchronized image capturing in the clock synchronization system 1.

The correction value is a value that is determined within the threshold value and is for correcting the counter 2 (32) based on the counter 1 (31). The correction value can be a fixed value. The correction value can be a value less than the threshold value or can be the same value as the threshold value.

The control information 305 can further include a default value to be used in resetting the counters 1 (31) and 2 (32) and a default value for incrementing the counters 1 (31) and 2 (32).

Figure 4:
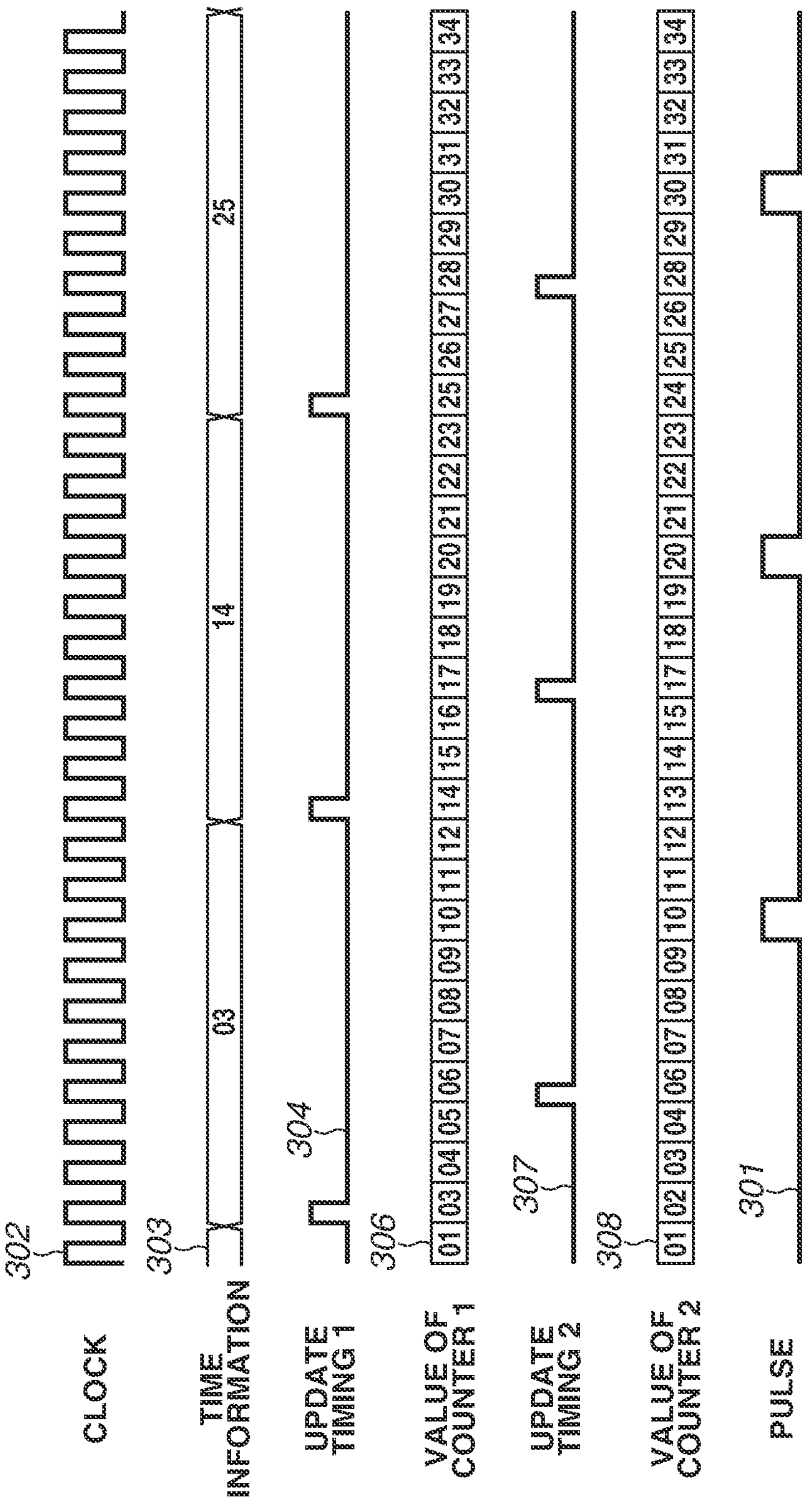
FIG. 4 is a timing chart illustrating a process of generating a synchronization signal by a synchronization signal generation unit according to an exemplary embodiment of the present disclosure.

FIG. 4 is a timing chart illustrating a process of generating a synchronization signal by the synchronization signal generation unit 24 according to the present exemplary embodiment. Specifically, FIG. 4 illustrates the process from when the time information 303 and the update timing 1 (304) are input from the communication units 21*a* and 21*b* to the synchronization signal generation unit 24 and until when the synchronization signal generation unit 24 in FIG. 3 generates the pulse 301.

While each of the time information 303, the value 306 of the counter 1 (31), and a value 308 of the counter 2 (32) in FIG. 4 is a two-digit number for simplification of description, the number of digits can be any number. Further, while an increment value is set to one, the increment value can be determined based on a clock and a pulse timing. The increment value of the counter 2 (32) is determined by synchronization signal correction processing described below with reference to FIG. 6. FIG. 4 illustrates operations in a case where the difference between the counters 1 (31) and 2 (32) is within the threshold value.

In FIG. 4, the output of the pulse 301 rises when the value 308 of the counter 2 (32) changes from nine to zero, and the output of the pulse 301 falls when the value 308 of the counter 2 (32) changes from zero to one. In FIG. 4, the time information 303 and the update timing 1 (304) are input to the synchronization signal generation unit 24 at time 03, time 14, and time 25.

The value 306 of the counter 1 (31) is a value of an internal counter of the counter 1 (31). The counter 1 (31) increments the value 306 of the counter 1 (31) using the clock 302 before the update timing 1 (304), and the value 306 of the counter 1 (31) is updated with the value of the time information 303 during the timing of the update timing 1 (304). The value 306 of the counter 1 (31) is transmitted as a reference for updating (correcting) the value 308 of the counter 2 (32) to the counter 2 (32). In FIG. 4, the value 306 of the counter 1 (31) is overwritten with the value of the time information 303 by the input (rise) of the update timing 1 (304).

The update timing 2 (307) is a signal for notification of a timing to update the value 308 of the counter 2 (32) with the value 306 of the counter 1 (31). The counter 1 (31) generates the update timing 2 (307) based on the value 306 of the counter 1 (31) and transmits the generated update timing 2 (307) as a pulse to the counter 2 (32). In FIG. 4, the update timing 2 (307) is transmitted to the counter 2 (32) at a timing of an eleven clock period at which the value 306 of the counter 1 (31) is 06, 17, or 28.

In a case where the transmission timing of the update timing 2 (307) overlaps with the transmission timing of the pulse 301, pulses may be transmitted doubly, or pulses may not be transmitted. In this case, the synchronization signal generation unit 24 sets the update timing 2 (307) in such a way that the transmission of the update timing 2 (307) does not temporally overlap with the output timing of the pulse 301, whereby an effect on transmission of the pulse 301 is avoided. The update timing 1 (304) is an externally inserted signal, and in a case where the timing of the update timing 1 (304) is predictable, the synchronization signal generation unit 24 can avoid the predictable timing to avoid an effect on the update timing 2 (307).

The value 308 of the counter 2 (32) is the value of the internal counter of the counter 2 (32) for generating the pulse

301 to be output. The value 308 of the counter 2 (32) is updated with the value 306 of the counter 1 (31) at the timing of the update timing 2 (307) notified from the counter 1 (31).

In FIG. 4, each time the value 308 of the counter 2 (32) is incremented by ten, the synchronization signal generation unit 24 outputs the pulse 301. Thus, the synchronization signal generation unit 24 adjusts the timing at which the value 308 of the counter 2 (32) is changed to ten, i.e., the transmission timing of the pulse 301, by rewriting the value 308 of the counter 2 (32).

Alternatively, the synchronization signal generation unit 24 can adjust the transmission timing of the pulse 301 by adding or subtracting the setting value for transmission of the pulse 301 without rewriting the value 308 of the counter 2 (32). For example, in a case where transmission of the pulse 301 is to be adjusted backward by three clock ticks, the synchronization signal generation unit 24 can correct the setting value for the transmission timing from ten to thirteen.

Figure 5:
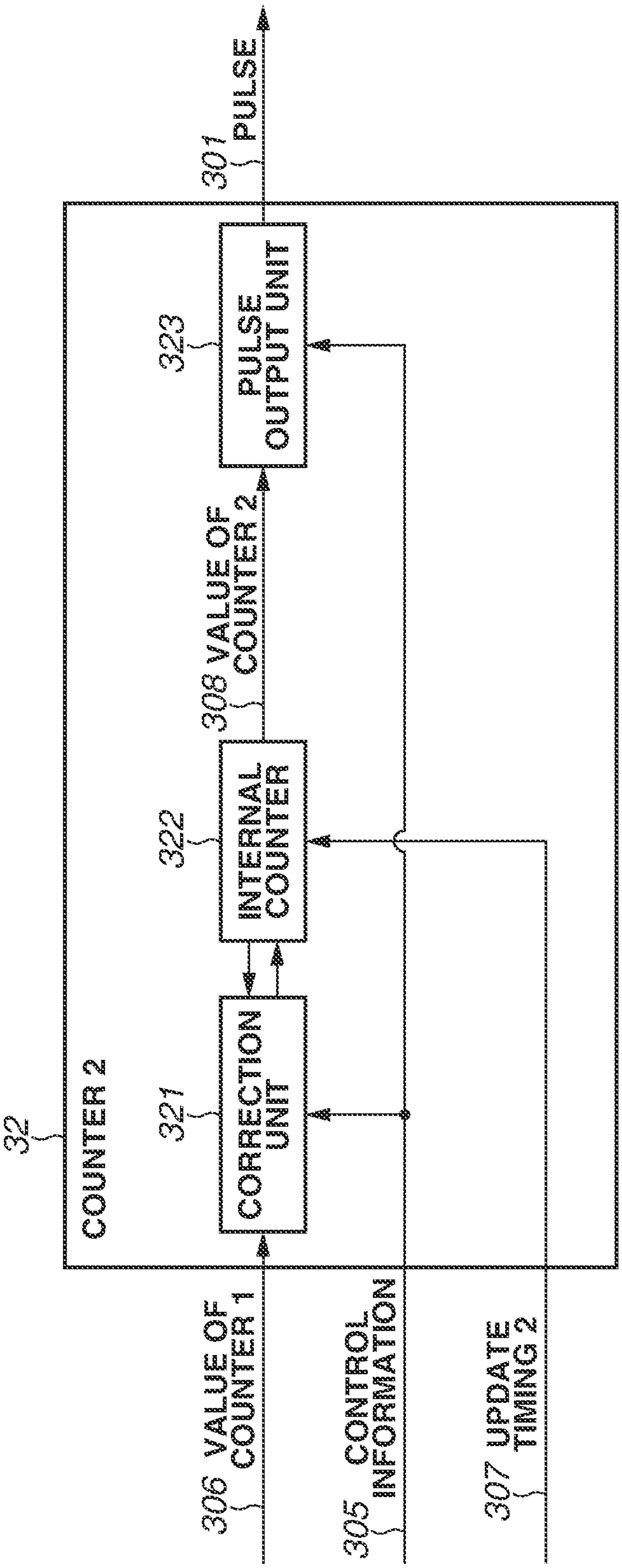
FIG. 5 is a block diagram illustrating an example of a detailed internal configuration of a counter 2 illustrated in FIG. 3.

FIG. 5 is a block diagram illustrating an example of a detailed internal configuration of the counter 2 (32) illustrated in FIG. 3. In FIG. 5, the counter 2 (32) includes a correction unit 321, an internal counter 322, and a pulse output unit 323.

The counter 2 (32) transmits the pulse 301 in the synchronization signal generation unit 24. Specifically, the counter 2 (32) receives the value 306 of the counter 1 (31) and the value of the update timing 2 (307) from the counter 1 (31) and receives the control information 305 from the bus interface 33 and transmits the pulse 301 based on a value of the internal counter 322.

The correction unit 321 designates an increment value of the internal counter 322. Specifically, the correction unit 321 calculates a difference between the value 306 of the counter 1 (31) and the value of the internal counter 322, calculates an increment value of the internal counter 322 based on the calculated difference value, and outputs the calculated increment value to the internal counter 322.

The difference value herein is the absolute value of the value obtained by subtracting the value 306 of the counter 1 (31) from the value 308 of the counter 2 (32) that is output from the internal counter 322 but can be a positive or negative value. In a case where the value 306 of the counter 1 (31) is behind the internal counter 322, the internal counter 322 is stopped to wait until the value 306 of the counter 1 (31) is corrected and incremented to the value of the internal counter 322 that is stopped.

According to the present exemplary embodiment, the threshold value for changing a correction method and the correction value that are obtained from the control information 305 are used as the increment value of the internal counter 322 besides the difference value between the counters 1 (31) and 2 (32). Details thereof will be described below with reference to FIG. 6. In a case where correction to stop the internal counter 322 is to be performed, the correction unit 321 outputs, for example, zero as the increment value to the internal counter 322.

The internal counter 322 is a counter that allows the value of the counter to be updated, and in a case where a clock is provided, the internal counter 322 adds or subtracts the value provided from the correction unit 321 to or from the value of the internal counter 322.

The pulse output unit 323 generates the pulse 301 based on the value 308 of the counter 2 (32) output by the internal counter 322 and outputs the generated pulse 301 to the video image transmission processing unit 25 and the image capturing apparatus control unit 26.

In a case where the correction unit 321 is to correct the internal counter 322, the pulse output unit 323 transmits the pulse 301 when the corrected value 308 of the counter 2 (32) becomes a specific value. The correction unit 321 can directly correct the pulse output unit 323 and adjust the timing to transmit the pulse 301. In this case, the pulse output unit 323 can transmit the pulse 301 when the value 308 of the counter 2 (32) becomes the correction value.

Figure 6:
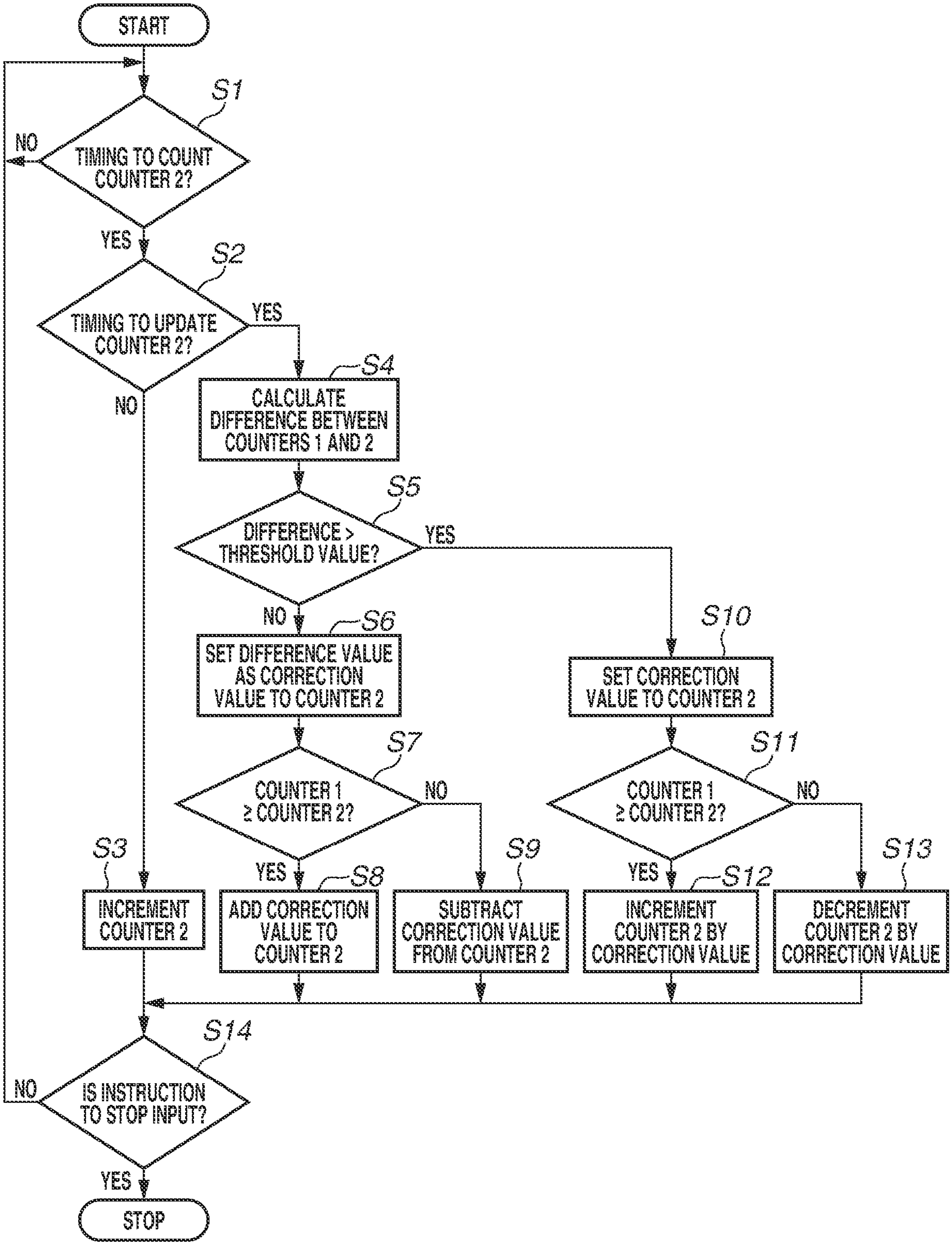
FIG. 6 is a flowchart illustrating an example of a processing procedure of correcting the counter 2 that is executed by a synchronization signal generation unit of a synchronization communication apparatus according to a first exemplary embodiment.

Synchronization Signal Correction Processing According to Present Exemplary Embodiment FIG. 6 is a flowchart illustrating an example of a process of correcting the counter 2 that is executed by the synchronization signal generation unit 24 of the synchronization communication apparatus **12*b*** according to the present exemplary embodiment.

A CPU reads a program stored in a ROM of the synchronization communication apparatus **12*b* and executes the read program to realize the steps illustrated in FIG. 6 when the synchronization communication apparatus 12*b* is turned on and activated. Alternatively, the steps illustrated in FIG. 6 can be executed in a case where an operation mode is changed to a predetermined operation mode by a user operation or in a case where a predetermined application is activated instead of a case where the synchronization communication apparatus 12*b* is turned on. The steps illustrated in FIG. 6** can be executed periodically at predetermined intervals while a clock synchronization network is established.

In FIG. 6, the counter 2 (32) of the synchronization signal generation unit 24 receives the value 306 of the counter 1 (31) from the counter 1 (31) and the control information 305 from the bus interface 33, generates the pulse 301, and output the generated pulse 301. The flowchart in FIG. 6 includes mainly the self-operation of the counter 2 (32), the correction processing in a case where the difference value is less than or equal to the threshold value, and the correction processing in a case where the difference value is greater than the threshold value. The correction processing is executed by the correction unit 321 of the counter 2 (32).

While the difference value and the correction value are the absolute values in FIG. 6, the difference value and the correction value can be a positive or negative value as described above. In a case where the difference value and the correction value are held as a real number, steps S7 and S10 to S13 are not executed, and it is sufficient to execute the correction processing of step S8. On the other hand, in a case where the correction value is held as the absolute value, re-calculation is not needed in setting for a wait counter in FIG. 9 described below.

In step S1, the counter 2 (32) of the synchronization signal generation unit 24 of the synchronization communication apparatus **12*b* determines whether it is a timing to count the value 308 of the counter 2 (32). In a case where the counter 2 (32) determines that it is not a timing to count the value 308 of the counter 2 (32) (NO in step S1), the processing of step S1 is looped to wait for a timing to count the value 308 of the counter 2 (32). On the other hand, in a case where the counter 2 (32) determines that it is a timing to count the value 308 of the counter 2 (32**) (YES in step S1), the processing proceeds to step S2.

In step S2, the counter 2 (32) of the synchronization signal generation unit 24 refers to the update timing 2 (307) and determines whether it is a timing to update (correct) the counter 2 (32). In a case where the counter 2 (32) determines that it is not a timing to update the counter 2 (32) (NO in step S2), the processing proceeds to step S3. In step S3, the counter 2 (32) is incremented using the clock 302 without correcting the value 308 of the counter 2 (32), and the processing proceeds to step S14. On the other hand, in a case where the counter 2 (32) determines that it is a timing to update the counter 2 (32) (YES in step S2), the processing proceeds to step S4.

In step S4, the correction unit 321 of the counter 2 (32) of the synchronization signal generation unit 24 calculates the difference between the value 308 of the counter 2 (32) and the value 306 of the counter 1 (31) to correct the value 308 of the counter 2 (32) toward the value 306 of the counter 1 (31).

In step S5, the correction unit 321 determines whether the difference value between the counters 1 (31) and 2 (32) that is calculated in step S4 is greater than a predetermined threshold. The predetermined threshold value that is referred to in step S5 is a maximum allowable error of the time below which the synchronization communication apparatus 12*b* and the image capturing apparatus 14*b* do not go out of clock synchronization, i.e., synchronized image capturing by the plurality of image capturing apparatuses 14*a* to 14*f* is assured. The predetermined threshold value is contained in the control information 305 received from the control unit 22 via the bus interface 33.

In a case where the correction unit 321 determines that the difference value calculated in step S4 is less than or equal to the predetermined threshold value (NO in step S5), the processing proceeds to step S6. On the other hand, in a case where the correction unit 321 determines that the difference value is greater than the predetermined threshold value (YES in step S5), the processing proceeds to step S10.

In step S6, since the difference between the value 306 of the counter 1 (31) and the value 308 of the counter 2 (32) is less than or equal to the threshold value, the correction unit 321 sets the difference value calculated in step S4 as the correction value to the counter 2 (32). The difference value between the counters 1 (31) and 2 (32) is set as the correction value to the counter 2 (32) so that the value 308 of the counter 2 (32) is corrected by the difference value in the calculation in subsequent steps S8 and S9. Thus, the value 308 of the counter 2 (32) matches the value 306 of the counter 1 (31) as a result of a single correction.

In step S7, the correction unit 321 determines whether the difference value between the value 308 of the counter 2 (32) and the value 306 of the counter 1 (31) is a positive value or a negative value. The correction unit 321 determines whether the difference value calculated in step S4 is a positive value or a negative value, and in a case where the value 306 of the counter 1 (31) is greater than or equal to the value 308 of the counter 2 (32) (YES in step S7), the processing proceeds to step S8. On the other hand, in a case where the value 306 of the counter 1 (31) is less than the value 308 of the counter 2 (32) (NO in step S7), the processing proceeds to step S9.

In a case where the value 306 of the counter 1 (31) is greater than or equal to the value 308 of the counter 2 (32), in step S8, the correction unit 321 determines that the value 308 of the counter 2 (32) is behind the value 306 of the counter 1 (31) and adds the difference value serving as the correction value to the value 308 of the counter 2 (32). By this addition, the correction unit 321 corrects the value 308 of the counter 2 (32) to match the value 306 of the counter 1 (31).

On the other hand, in a case where the value 306 of the counter 1 (31) is less than the value 308 of the counter 2 (32), in step S9, the correction unit 321 determines that the value 308 of the counter 2 (32) is ahead of the value 306 of the counter 1 (31), and the correction unit 321 subtracts (decrements) the difference value serving as the correction value from the value 308 of the counter 2 (32). By this subtraction, the correction unit 321 corrects the value 308 of the counter 2 (32) to match the value 306 of the counter 1 (31). In step S9, in correcting the value 308 of the counter 2 (32) to match the value 306 of the counter 1 (31), the updating of the value 308 of the counter 2 (32) can be stopped for the time corresponding to the difference value.

Back to step S5, in a case where the difference value calculated in step S4 is greater than the predetermined threshold value (YES in step S5), in step S10, the correction unit 321 sets the correction value designated by the control information 305 received from the control unit 22 via the bus interface 33 as the correction value to the counter 2 (32).

The predetermined threshold value that is referred to in step S5 is a maximum allowable error of a range within which the image capturing apparatus 14*b* can maintain clock synchronization, and since the correction value is equal to or less than the predetermined threshold value, the correction unit 321 corrects the synchronization signal while maintaining clock synchronization with the image capturing apparatus 14*b*.

On the other hand, in step S10, since the correction value is less than the difference value calculated in step S4, correction of the value 308 of the counter 2 (32) to match the value 306 of the counter 1 (31) is not completed even if the calculations in subsequent steps S12 and S13 are executed one time. According to the present exemplary embodiment, the value 308 of the counter 2 (32) is corrected by the correction value repeatedly until the difference value becomes less than or equal to the threshold value, to correct the value 308 of the counter 2 (32) toward the value 306 of the counter 1 (31) step by step (steps S10 to S13). Then, after the difference value becomes less than or equal to the threshold value, the value 308 of the counter 2 (32) is corrected by the difference value to correct the value 308 of the counter 2 (32) to match the value 306 of the counter 1 (31).

In step S11, the correction unit 321 determines whether the difference value between the value 308 of the counter 2 (32) and the value 306 of the counter 1 (31) is a positive value or a negative value. The correction unit 321 determines whether the difference value calculated in step S4 is a positive value or a negative value, and in a case where the value 306 of the counter 1 (31) is greater than or equal to the value 308 of the counter 2 (32) (YES in step S11), the processing proceeds to step S12. On the other hand, in a case where the value 306 of the counter 1 (31) is less than the value 308 of the counter 2 (32) (NO in step S11), the processing proceeds to step S13.

In a case where the value 306 of the counter 1 (31) is greater than or equal to the value 308 of the counter 2 (32), in step S12, the correction unit 321 determines that the value 308 of the counter 2 (32) is behind the value 306 of the counter 1 (31), and the correction unit 321 increments the value 308 of the counter 2 (32) by the correction value. Since the correction value that is added to the value 308 of the counter 2 (32) in step S12 is less than the difference value calculated in step S4, the value 308 of the counter 2 (32) does not match the value 306 of the counter 1 (31) by a single correction.

On the other hand, in a case where the value 306 of the counter 1 (31) is less than the value 308 of the counter 2 (32), in step S13, the correction unit 321 determines that the value 308 of the counter 2 (32) is ahead of the value 306 of the counter 1 (31), and the correction unit 321 decrements the value 308 of the counter 2 (32) by the correction value. Since the correction value that is subtracted from the value 308 of the counter 2 (32) in step S13 is less than the difference value calculated in step S4, the value 308 of the counter 2 (32) does not match the value 306 of the counter 1 (31) by a single correction.

As described above, according to the present exemplary embodiment, in a case where the difference value is greater than the threshold value, the correction unit 321 corrects the value 308 of the counter 2 (32) a plurality of times. Thus, the value 308 of the counter 2 (32) is corrected toward the value 306 of the counter 1 (31) step by step, and the value 308 of the counter 2 (32) eventually matches the value 306 of the counter 1 (31). In step S13, in correcting the value 308 of the counter 2 (32), the updating of the value 308 of the counter 2 (32) can be stopped for the time corresponding to the correction value.

After the processing of each of steps S3, S8, S9, S12, and S13 ends, the processing proceeds to step S14, and the counter 2 (32) of the synchronization signal generation unit 24 determines whether an instruction to stop the series of processing is input. In a case where an instruction to stop the processing is input (YES in step S14), the synchronization signal correction process in FIG. 6 ends. On the other hand, in a case where an instruction to stop the processing is not input (NO in step S14), the processing returns to step S1, and steps S1 to S13 are executed again.

As described above, according to the present exemplary embodiment, in generating a synchronization signal for clock synchronization with a counterpart apparatus, a synchronization communication apparatus corrects the time of the synchronization communication apparatus using a reference time supplied from a time server and generates a synchronization signal based on the corrected time of the synchronization communication apparatus.

Then, the synchronization communication apparatus calculates the difference between a first counter synchronized with the reference time and a second counter, and in a case where the calculated difference is greater than a predetermined threshold value, the synchronization communication apparatus corrects the value of the second counter a plurality of times step by step to correct the value of the second counter toward the value of the first counter.

Even in a case where an error between the reference time supplied from the time server and the time of the synchronization communication apparatus is greater than the threshold value, since clock synchronization with the reference time is executed, clock synchronization with a counterpart apparatus, such as synchronized image capturing by a plurality of devices, is continued.

In a case where the error between the reference time and the time of the synchronization communication apparatus is greater than the threshold value, a correction amount by which the second counter is corrected in a single correction is limited within a predetermined range, and the value of the second counter is corrected step by step. Thus, even in a case where, for example, an abrupt change occurs in the first counter synchronized with the reference time of the time server, clock synchronization with the counterpart apparatus is continued while the time server is followed, and the accuracy of clock synchronization increases.

Second Exemplary Embodiment

A second exemplary embodiment will be described in detail below with reference to FIGS. 7 and 8. Differences between the second exemplary embodiment and the first exemplary embodiment will be described below.

A counterpart apparatus to be clock synchronized, e.g., an image capturing apparatus, has a synchronization signal reception timing of a predetermined period during which a synchronization signal output from a synchronization communication apparatus is receivable.

According to the second exemplary embodiment, the value 308 of the counter 2 (32) is corrected in such a way that the counterpart apparatus receives the synchronization signal within the period of the synchronization signal reception timing.

An internal configuration of the synchronization communication apparatus according to the second exemplary embodiment is similar to that illustrated in FIGS. 1 to 5 according to the first exemplary embodiment.

Figure 7:
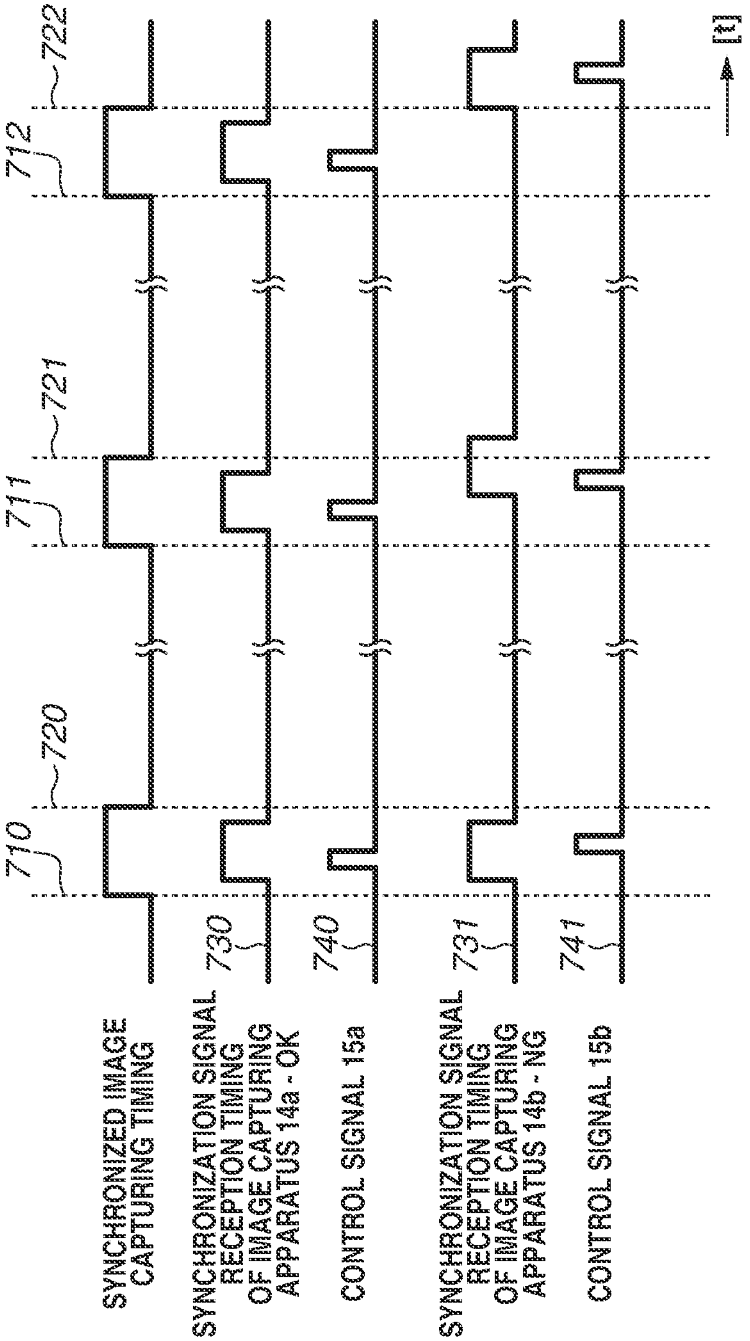
FIG. 7 is a waveform diagram illustrating an example of a relationship between a synchronized image capturing timing of a clock synchronization system and a synchronization signal reception timing of each image capturing apparatus.

FIG. 7 is a waveform diagram illustrating an example of a relationship between a synchronized image capturing timing and an synchronization signal reception timing of each image capturing apparatus in a synchronized image capturing system.

In normal image capturing, image capturing is to be executed during an interval of a frame rate set to an image capturing apparatus, whereas in synchronized image capturing, a plurality of image capturing apparatuses is to complete image capturing during a synchronized image capturing timing in a frame rate, to execute synchronized image capturing as a system.

In FIG. 7, synchronization signal reception timings 730 and 731 for the image capturing apparatuses 14*a* and 14*b*, respectively, are each generated based on a corresponding one of previously-received control signals 740 and 741. In a case where the image capturing apparatuses 14*a* and 14*b* receive the control signals 740 and 741 at a timing outside the synchronization signal reception timing, re-synchronization processing needs to be executed, and normal synchronized image capturing can no longer be continued.

In FIG. 7, broken lines of image capturing times 710, 711, and 712 each represent a start point of an image capturing time of the image capturing apparatuses 14*a* and 14*b*. In a case where the frame rate of image capturing is 24 fps (frame per second), a start point is at every 1/24 seconds, whereas in a case where the frame rate is 50 fps, a start point is at every 1/50 seconds. Broken lines of synchronized image capturing timings 720, 721, and 722 each represent an end point of a synchronized image capturing timing in the synchronized image capturing system. The image capturing apparatuses 14*a* and 14*b* complete image capturing during a rise period of the synchronized image capturing timing to execute synchronized image capturing by the entire system.

In FIG. 7, solid lines of the synchronization signal reception timings 730 and 731 each represent a synchronization signal reception timing during which the image capturing apparatuses 14*a* and 14*b* are ready to receive the synchronization signal. The image capturing apparatuses 14*a* and 14*b* update the time of the image capturing apparatuses 14*a* and 14*b*, respectively, based on the corresponding one of the control signals 15*a* and 15*b*, wait for a next expected control signal, and receive the corresponding one of the control signals 15*a* and 15*b* during the synchronization signal reception timings 730 and 731 to thereby maintain clock synchronization.

Solid lines of synchronization signals 740 and 741 represent synchronization pulses of the control signals 15*a* and 15*b*, respectively. The image capturing apparatuses 14*a* and 14*b* each receive the corresponding one of the synchronization signals (pulses) 740 and 741 during the synchronization signal reception timings 730 and 731, change the corresponding one of the synchronization signal reception timings 730 and 731 to an on-state again after a predetermined period, and wait for the synchronization signals (pulses) 740 and 741.

For example, a case where the synchronization communication apparatuses 12*a* and 12*b* cannot update the time of the synchronization communication apparatuses 12*a* and 12*b* with the time of the time server 11 as a result that the synchronization communication apparatuses 12*a* and 12*b* become unable to clock synchronize will be discussed below. Even in this case, the synchronization communication apparatuses 12*a* and 12*b* cause the internal clocks to self-operate and continuously transmit the control signals 15*a* and 15*b*, respectively, to thereby maintain clock synchronization between the synchronization communication apparatuses 12*a* and 12*b* and the image capturing apparatuses 14*a* and 14*b*. This may cause a difference between the control signals 15*a* and 15*b* that are out of clock synchronization with the time server 11 due to, for example, accumulated jitter of the clocks of the synchronization communication apparatuses 12*a* and 12*b* over time and the synchronized image capturing timing of the system synchronized with the time of the time server 11.

In FIG. 7, since the pulse of the control signal 15*a* is within the period of the synchronization signal reception timing 730 of the image capturing apparatus 14*a*, the synchronization communication apparatus 12*a* is clock synchronized with the image capturing apparatus 14*a*. Since the pulse of the control signal 15*a* is also within the synchronized image capturing timings 720 to 722 of the system, the image capturing apparatus 14*a* successfully performs synchronized image capturing in the system.

Since the pulse of the control signal 15*b* is within the period of the synchronization signal reception timing 731 of the image capturing apparatus 14*b*, the synchronization communication apparatus 12*b* is clock synchronized with the image capturing apparatus 14*b*. However, on the contrary, since the pulse of the control signal 15*b* is off the synchronized image capturing timing 722 of the system, the image capturing apparatus 14*b* is not successfully performing synchronized image capturing in the system.

Figure 8:
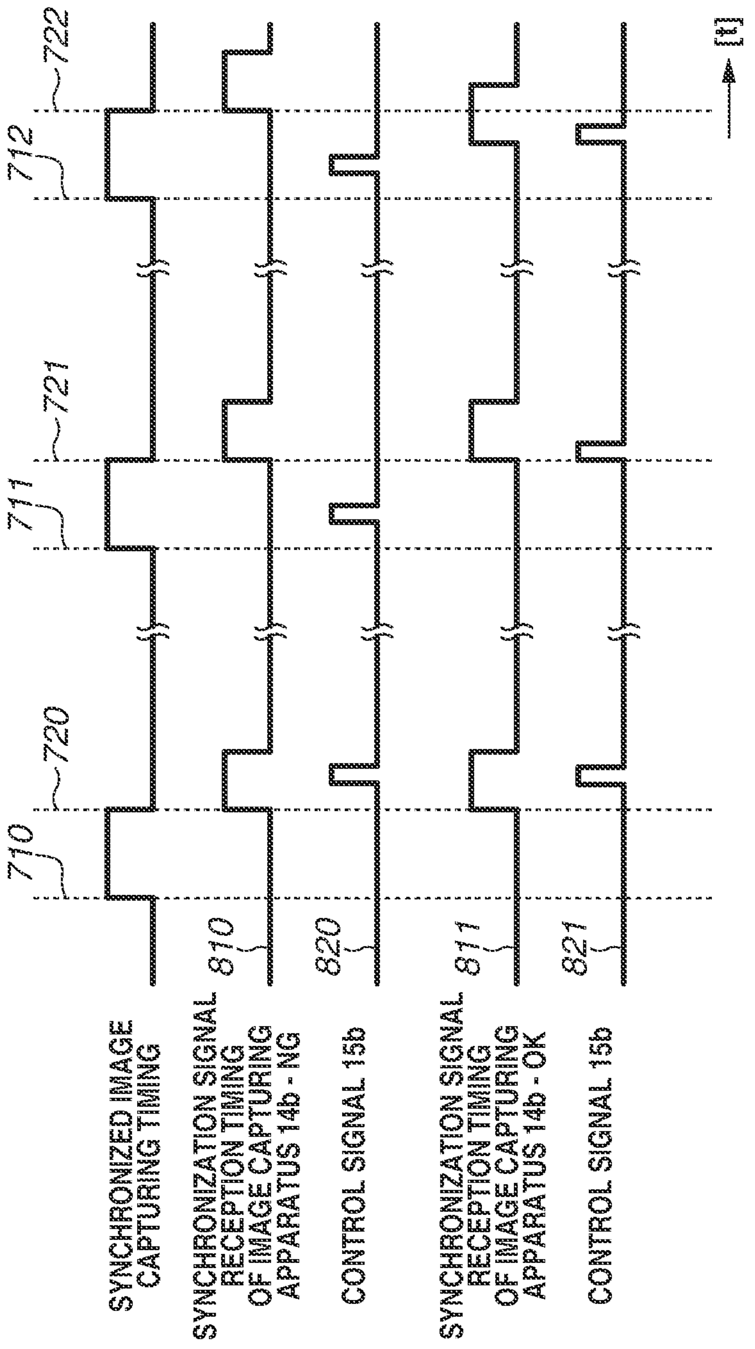
FIG. 8 is a waveform diagram illustrating an example of an output timing of a control signal that is corrected by a synchronization signal generation unit of a synchronization communication apparatus according to a second exemplary embodiment.

FIG. 8 is a waveform diagram illustrating the correcting of the synchronization signal according to the present exemplary embodiment in a case where the synchronization signal is off the synchronization signal reception timing of the image capturing apparatus 14*b* in the synchronized image capturing timing in FIG. 7.

A solid line of synchronization signal reception timing 810 indicates a waveform of the synchronization signal reception timing of the image capturing apparatus 14*b* in a case where the control signal 15*b* is corrected to fall within the synchronized image capturing timing of the system. The image capturing apparatus 14*b* receives the synchronization signal only during the synchronization signal reception timing 810 and sets a next synchronization signal reception timing after a predetermined period.

The image capturing apparatus 14*b* receives the control signal 15*b* during the first synchronization signal reception timing 810 at the first image capturing time 710, but at the next image capturing time 711, the pulse of the control signal 15*b* is off the synchronization signal reception timing 810. Thus, the image capturing apparatus 14*b* enters re-synchronization processing at the image capturing time 712 and thereafter.

In FIG. 8, a solid line of a synchronization signal reception timing 820 indicates a waveform of the synchronization signal in the control signal 15*b* received by the image capturing apparatus 14*b* in a case where the control signal 15*b* is corrected to fall within the synchronized image capturing timing of the system. At the first image capturing time 710, since the synchronization signal of the control signal 15*b* is not within the synchronized image capturing timing 720 of the system, the image capturing apparatus 14*b* is not successfully performing synchronized image capturing in the system.

If the synchronization signal is to corrected to fall within the synchronized image capturing timing 721 for synchronized image capturing of the system at the next image capturing time 711, the pulse of the control signal 15*b* falls outside the synchronization signal reception timing 810. Thus, the image capturing apparatus 14*b* is to be re-synchronized at image capturing time 712 which is the next synchronized image capturing timing, and synchronized image capturing cannot be performed until the re-synchronization processing ends.

On the contrary, a solid line of synchronization signal reception timing 811 indicates a waveform of the synchronization signal reception timing of the image capturing apparatus 14*b* in a case where the control signal 15*b* is corrected within the range of the synchronization signal reception timing of the image capturing apparatus 14*b*. The image capturing apparatus 14*b* receives the synchronization signal during the synchronization signal reception timing 811 and sets a next synchronization signal reception timing after a predetermined period.

The image capturing apparatus 14*b* receives the control signal 15*b* during the first synchronization signal reception timing 811 at the first image capturing time 710, and at the next image capturing time 711, the image capturing apparatus 14*b* receives the control signal 15*b* similarly. Since the synchronization signal is received at a slightly early timing during the image capturing time 711, the timing of the synchronization signal reception timing 811 is also shifted in the early direction at the next image capturing time 712 after a predetermined time from the reception of the synchronization signal. Thus, at the image capturing time 712, the synchronization signal reception timing 811 partly overlaps the synchronized image capturing timing 722 of the system.

In FIG. 8, a solid line of a synchronization signal 821 indicates a waveform of the synchronization signal in the control signal 15*b* received by the image capturing apparatus 14*b* in a case where the threshold value for the correction of the control signal 15*b* is adjusted within the synchronization signal reception timing 811 of the image capturing apparatus 14*b*. At the first image capturing time 710, the synchronization signal of the control signal 15*b* is not within the synchronized image capturing timing 720 of the system. Thus, at the next image capturing time 711, the synchronization signal is corrected toward the synchronized image capturing timing 721 of the system within the synchronization signal reception timing 811. Consequently, since the synchronization signal reception timing 811 at the next image capturing time 712 is calculated based on the synchronization signal received in the synchronization signal reception timing 811 at the previous image capturing time 711, the synchronization signal reception timing 811 becomes closer to the synchronized image capturing timing 722 of the system compared to the synchronization signal reception timing 810. The synchronization signal at the image capturing time 712 becomes much closer to the synchronized image capturing timing 722 of the system within the range of the synchronization signal reception timing 811. Consequently, the image capturing apparatus 14*b* receives the synchronization signal during the synchronization signal reception timing 811 in the synchronized image capturing timing 722 of the system, and re-synchronization becomes unnecessary.

As described above, according to the present exemplary embodiment, the synchronization signal generation units 24 of the synchronization communication apparatuses 12*a* to 12*f* adjust the threshold value for the correction of the synchronization signal to fall within the ranges of the synchronization signal reception timings of the image capturing apparatuses 14*a* to 14*f* that are counterpart apparatuses to be clock synchronized. Thus, while clock synchronization between the synchronization communication apparatuses 12*a* to 12*f* and the image capturing apparatuses 14*a* to 14*f* is maintained, the control signals 15*a* to 15*f* are adjusted to fall within the synchronized image capturing timing of the system, and synchronized image capturing can be continued.

Third Exemplary Embodiment

A third exemplary embodiment will be described in detail below with reference to FIG. 9. Differences between the third exemplary embodiment and the above-described exemplary embodiments will be described below.

According to the present exemplary embodiment, the internal counter 322 further includes the wait counter (not illustrated) configured to hold a period of stopping the counter 2 (32), and in a case where the counter 2 (32) is ahead of the counter 1 (31), the counter 2 (32) is corrected by stopping the counter 2 (32) (by causing the counter 2 (32) to wait).

Figure 9:
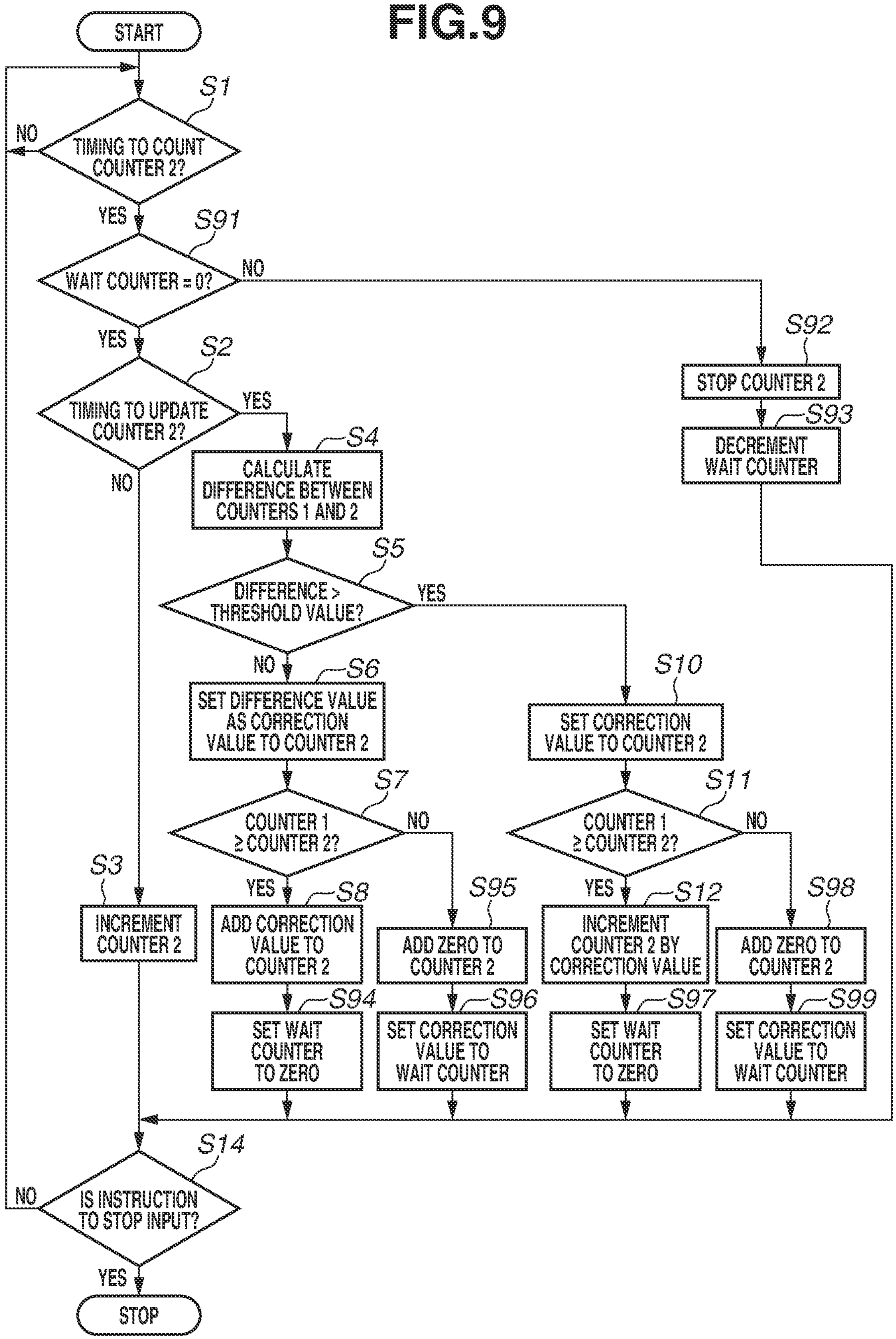
FIG. 9 is a flowchart illustrating an example of a processing procedure of correcting a counter 2 that is executed by a synchronization signal generation unit of a synchronization communication apparatus according to a third exemplary embodiment.

FIG. 9 is a flowchart illustrating an example of a process of correcting the counter 2 (32) that is executed by a synchronization signal generation unit of a synchronization communication apparatus according to the third exemplary embodiment.

The correction process according to the third exemplary embodiment illustrated in FIG. 9 is different from the first exemplary embodiment illustrated in FIG. 6 in that the wait counter is set and steps S91 to step S99 in which the wait counter is used in correcting the counter 2 are added.

According to the present exemplary embodiment, the counters 2 (32) of the synchronization communication apparatuses 12*a* to 12*f* each include the wait counter in the internal counter 322, and while a non-zero value is stored in the wait counter, the increment of the self-operation of the counter 2 (32) is temporarily stopped. During the temporary stop, the value 306 of the counter 1 (31) reaches the value 308 of the counter 2 (32) so that the value 308 of the counter 2 (32) is corrected to match the value 306 of the counter 1 (31).

When the correction unit 321 writes to the wait counter, the internal counter 322 decrements the wait counter until the wait counter reaches zero, and during that time, the updating of the value 308 of the counter 2 (32) can be waited.

In FIG. 9, in step S1, in a case where it is a timing to count the counter 2 (32) (YES in step S1), in step S91, the counter 2 (32) of the synchronization signal generation unit 24 determines whether the value of the wait counter of the internal counter 322 is zero. In a case where the value of the wait counter is not zero (NO in step S91), the processing proceeds to step S92. On the other hand, in a case where the value of the wait counter is zero (YES in step S91), the processing proceeds to step S2.

In step S92, the counter 2 (32) stops the self-count of the counter 2 (32) for one clock. Consequently, the counter 1 (31) is corrected toward the counter 2 (32) by one clock. To stop the counter 2 (32), zero is provided as the increment value, and zero can be added, or the count processing does not have to be executed.

In step S93, the counter 2 (32) decrements the wait counter of the internal counter 322 and updates the number of clocks for the counter 1 (31) to reach the counter 2 (32).

The processing of stopping the self-count of the counter 2 (32) in steps S92 and S93 is repeated until the wait counter=0 so that the value 306 of the counter 1 (31) is corrected toward the value 308 of the counter 2 (32) by the value of the wait counter.

Back to step S2, in a case where it is a timing to update the counter 2 (32), in step S8 in the processing of correcting the counter 2 (32), the correction unit 321 adds the correction value (difference value) set in step S6 to the counter 2 (32). Thereafter, in step S94, the wait counter is set to zero. Thus, in the next loop, the counter 2 (32) is incremented in step S3 until a timing to update the counter 2 (32).

On the other hand, in step S7, in a case where it is determined that the value 308 of the counter 2 (32) is greater than the value 306 of the counter 1 (31) (NO in step S7), the processing proceeds to step S95 in place of the subtraction of the counter 2 (32) (step S9) in FIG. 6.

In step S95, the correction unit 321 adds zero to the counter 2 (32), stops the counter 2 (32), and waits until the counter 1 (31) reaches the counter 2 (32). To execute the counter stopping processing, zero can be added to the counter 2 (32), or the count processing can be stopped.

In step S96, the correction unit 321 sets the difference value as the correction value to the wait counter of the internal counter 322. Consequently, the counter 2 (32) is negatively corrected. The counter 2 (32) is corrected by the difference value so that in the next loop, the processing proceeds to step S92 to start the processing of stopping the counter 2 (32).

Back to step S2, in a case where it is a timing to update the counter 2 (32), in step S12 in the processing of correcting the counter 2 (32), the correction unit 321 increments the counter 2 (32) by the correction value set in step S10. Thereafter, in step S97, the correction unit 321 sets zero to the wait counter. Thus, in the next loop, the counter 2 (32) is incremented in step S3 until a timing to update the counter 2 (32).

On the other hand, in step S11, in a case where it is determined that the value 308 of the counter 2 (32) is greater than the value 306 of the counter 1 (31), the processing proceeds to step S98 instead of the processing of decrementing the counter 2 (32) (step S13) in FIG. 6.

In step S98, the correction unit 321 adds zero to the counter 2 (32), stops the counter 2 (32), and waits until the counter 1 (31) reaches the counter 2 (32). To execute the counter stopping processing, zero can be added to the counter 2 (32), or the count processing can be stopped.

In step S99, the correction unit 321 sets the correction value to the wait counter of the internal counter 322. Consequently, the counter 2 (32) is negatively corrected. The counter 2 (32) is corrected by the correction value so that in the next loop, the processing proceeds to step S92 to enter the processing of stopping the counter 2 (32).

The foregoing process is repeated until a stop instruction is input in step S14.

As described above, according to the present exemplary embodiment, in negatively correcting the counter 2 (32) by stopping the counter 2 (32), the wait counter holds the period of stopping the counter 2 (32). Thus, the synchronization signal is corrected step by step without directly rewriting the value 308 of the counter 2 (32).

MODIFIED EXAMPLES

The present disclosure can be implemented as, for example, a system, an apparatus, a method, a program, or a recording medium (storage medium). Specifically, the present disclosure is applicable to a system including a plurality of devices (e.g., host computer, interface device, image capturing apparatus, web application) or an apparatus consisting of a single device.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A communication apparatus including a first counter and a second counter, the communication apparatus comprising:

a clock signal generation unit configured to generate a first clock signal for the first counter to increment a value of the first counter and a second clock signal for the second counter to increment a value of the second counter;

a first increment unit configured to increment the value of the first counter based on the first clock signal;

a second increment unit configured to increment the value of the second counter based on the first clock signal;

a generation unit configured to generate a synchronization signal each time the value of the second counter is incremented by a predetermined number;

a transmission unit configured to transmit the synchronization signal to another apparatus;

an error acquisition unit configured to acquire an error based on the value of the first counter and the value of the second counter; and a control unit configured to control the second counter based on a correction value so that the value of the second counter is close to the value of the first counter, wherein the control unit sets a value based on the error as the correction value in a case where the error acquired by the error acquisition unit is smaller than a predetermined value, and wherein the control unit sets a value smaller than the predetermined value as the correction value in a case where the error acquired by the error acquisition unit is larger than the predetermined value.

2. The communication apparatus according to claim 1, wherein the correction value includes a first correction value smaller than the predetermined value and a second value smaller than the predetermined value, and wherein the control unit controls the second counter based on the first correction value and controls the second counter based on the second correction value in a case where the error is larger than the predetermined value.

3. The communication apparatus according to claim 2, wherein the control unit controls the second counter based on the second correction value when a predetermined period passes after the control unit controls the second counter based on the first correction value.

4. The communication apparatus according to claim 3, wherein the transmission unit transmits the synchronization signal during the predetermined period.

5. The communication apparatus according to claim 1, wherein the other apparatus includes a receiving unit configured to receive the synchronization signal during a first period in which the synchronization signal is receivable, and wherein the control unit controls the second counter based on a correction value smaller than the predetermined value so that the transmission unit transmits the synchronization signal during the first period.

6. The communication apparatus according to claim 1, wherein the control unit controls the second counter based on the correction value so that the value of the second counter is incremented in a case where the value of the second counter is behind the value of the first counter.

7. The communication apparatus according to claim 1, wherein the control unit controls the second counter based on the correction value so that the value of the second counter is decremented in a case where the value of the second counter is ahead of the value of the first counter.

8. The communication apparatus according to claim 1, wherein the control unit controls the second counter based on the correction value so that the second counter is stopped in a case where the value of the second counter is ahead of the value of the first counter.

9. The communication apparatus according to claim 8, further comprising a third counter configured to indicate a period in which the second counter is stopped, wherein the third counter decrements a value of the third counter during a period in which the control unit controls the second counter so that the second counter is stopped.

10. The communication apparatus according to claim 9, wherein the control unit controls the second counter so that the second counter performs self-operation of increment in a case where the value of the third counter is 0.

11. The communication apparatus according to claim 1, wherein the communication apparatus executes clock synchronization using the Precision Time Protocol (PTP) defined by the Institute of Electrical and Electronics Engineers (IEEE) 1588 standard.

12. A control method for controlling a communication apparatus including a first counter and a second counter, the control method comprising:

generating a first clock signal for the first counter to increment a value of the first counter and a second clock signal for the second counter to increment a value of the second counter;

incrementing the value of the first counter based on the first clock signal;

incrementing the value of the second counter based on the first clock signal;

generating a synchronization signal each time the value of the second counter is incremented by a predetermined number;

transmitting the synchronization signal to another apparatus;

acquiring an error based on the value of the first counter and the value of the second counter; and controlling the second counter based on a correction value so that the value of the second counter is closer to the value of the first counter, wherein, in the controlling, a value based on the error acquired in the acquiring is set as the correction value in a case where the error is smaller than a predetermined value, and wherein, in the controlling, a value smaller than the predetermined value is set as the correction value in a case where the error acquired in the acquiring is larger than the predetermined value.

13. A non-transitory storage medium storing a program to execute a control method for controlling a communication apparatus including a first counter and a second counter, the control method comprising:

generating a first clock signal for the first counter to increment a value of the first counter and a second clock signal for the second counter to increment a value of the second counter;

incrementing the value of the first counter based on the first clock signal;

incrementing the value of the second counter based on the first clock signal;

generating a synchronization signal each time the value of the second counter is incremented by a predetermined number;

transmitting the synchronization signal to another apparatus;

acquiring an error based on the value of the first counter and the value of the second counter; and controlling the second counter based on a correction value so that the value of the second counter is closer to the value of the first counter, wherein, in the controlling, a value based on the error acquired in the acquiring is set as the correction value in a case where the error is smaller than a predetermined value, and wherein, in the controlling, a value smaller than the predetermined value is set as the correction value in a case where the error acquired in the acquiring is larger than the predetermined value.

* * * * *